United States Patent
Damji et al.

(10) Patent No.: US 9,980,225 B2
(45) Date of Patent: *May 22, 2018

(54) METHODS AND APPARATUS FOR POWER SAVING IN DISCONTINUOUS RECEPTION-ADAPTIVE NEIGHBOR CELL SEARCH DURATION

(71) Applicant: Apple Inc., Cupertino, CA (US)

(72) Inventors: Navid Damji, Cupertino, CA (US); Zhu Ji, San Diego, CA (US); Johnson Sebeni, Fremont, CA (US); Jason Shi, Pleasanton, CA (US); Li Su, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 236 days.

This patent is subject to a terminal disclaimer.

(21) Appl. No.: 14/872,257

(22) Filed: Oct. 1, 2015

(65) Prior Publication Data

US 2016/0029314 A1    Jan. 28, 2016

Related U.S. Application Data

(63) Continuation of application No. 13/754,774, filed on Jan. 30, 2013, now Pat. No. 9,167,519.

(Continued)

(51) Int. Cl.
*H04L 1/00* (2006.01)
*H04W 52/02* (2009.01)
(Continued)

(52) U.S. Cl.
CPC ...... *H04W 52/0225* (2013.01); *H04B 17/309* (2015.01); *H04W 36/0083* (2013.01);
(Continued)

(58) Field of Classification Search
None
See application file for complete search history.

(56) References Cited

U.S. PATENT DOCUMENTS 6,819,927 B1 * 11/2004 Sato ............... H04B 1/7075
375/E1.003
8,060,153 B2    11/2011 Jeong et al.
(Continued)

FOREIGN PATENT DOCUMENTS

JP    2004242017        8/2004
JP    2009545927 A     12/2009
(Continued)

OTHER PUBLICATIONS

European Examination Report, Application No. 13740081.8, dated Dec. 22, 2015, 5 pages.

(Continued)

*Primary Examiner* — Jutai Kao
(74) *Attorney, Agent, or Firm* — Meyertons, Hood, Kivlin, Kowert & Goetzel, P.C.

(57) ABSTRACT

Methods and apparatus for adaptively adjusting temporal parameters (e.g., neighbor cell search durations). In one embodiment, neighbor cell search durations during discontinuous reception are based on a physical channel metric indicating signal strength and quality (e.g. Reference Signal Received Power (RSRP), Received Signal Strength Indication (RSSI), Reference Signal Receive Quality (RSRQ), etc.) of a cell. In a second embodiment, neighbor cell search durations are based on a multitude of physical layer metrics from one or more cells. In one variant, the multitude of physical layer metrics may include signal strength and quality metrics from the serving base station as well as signal strength and quality indicators from neighbor cells derived from the cells respective synchronization sequences.

20 Claims, 9 Drawing Sheets

Related U.S. Application Data

(60) Provisional application No. 61/593,202, filed on Jan. 31, 2012.

(51) Int. Cl.
*H04W 36/00* (2009.01)
*H04B 17/309* (2015.01)
*H04W 76/04* (2009.01)

(52) U.S. Cl.
CPC ... *H04W 36/0088* (2013.01); *H04W 52/0229* (2013.01); *H04W 52/0245* (2013.01); *H04W 76/048* (2013.01); *Y02D 70/00* (2018.01); *Y02D 70/1242* (2018.01); *Y02D 70/1262* (2018.01); *Y02D 70/1264* (2018.01); *Y02D 70/146* (2018.01); *Y02D 70/24* (2018.01); *Y02D 70/25* (2018.01)

(56) References Cited

U.S. PATENT DOCUMENTS

| | | | |
|---|---|---|---|
| 9,167,519 B2* | 10/2015 | Damji | H04W 52/0225 |
| 2005/0070285 A1* | 3/2005 | Goransson | H04W 36/30 |
| | | | 455/436 |
| 2006/0215592 A1* | 9/2006 | Tomoe | H04L 45/00 |
| | | | 370/315 |
| 2008/0057959 A1* | 3/2008 | Ida | H04W 48/16 |
| | | | 455/435.1 |
| 2008/0160918 A1 | 7/2008 | Jeong et al. | |
| 2009/0181676 A1 | 7/2009 | Lee et al. | |
| 2010/0120429 A1* | 5/2010 | Kazmi | H04W 36/30 |
| | | | 455/436 |
| 2011/0183669 A1* | 7/2011 | Kazmi | H04J 11/0086 |
| | | | 455/434 |
| 2012/0300667 A1 | 11/2012 | Dalsgaard et al. | |
| 2013/0252607 A1 | 9/2013 | Ngai et al. | |

FOREIGN PATENT DOCUMENTS

| | | |
|---|---|---|
| JP | 2010028168 A | 2/2010 |
| JP | 2010050969 A | 3/2010 |
| JP | 2010521119 | 6/2010 |
| JP | 2011155592 A | 8/2011 |
| JP | 2011229017 A | 11/2011 |
| KR | 1020110110259 A | 10/2011 |
| WO | 2011101543 A1 | 8/2011 |

OTHER PUBLICATIONS

Non-Final Office Action, Japanese Application No. 2014555704, dated Jun. 22, 2015, 10 pages.

Taiwanese Office Action from Application No. 102103778, dated Oct. 28, 2014, English and Chinese versions, pp. 1-19.

Office Action, Taiwan Application No. 102103778, dated Sep. 8, 2015, 20 pages.

* cited by examiner

METHODS AND APPARATUS FOR POWER SAVING IN DISCONTINUOUS RECEPTION-ADAPTIVE NEIGHBOR CELL SEARCH DURATION

PRIORITY AND RELATED APPLICATIONS

This application is a continuation of U.S. patent application Ser. No. 13/754,774, filed Jan. 30, 2013, entitled "METHODS AND APPARATUS FOR POWER SAVING IN DISCONTINUOUS RECEPTION-ADAPTIVE NEIGHBOR CELL SEARCH DURATION", which claims priority to co-owned U.S. Provisional Patent Ser. No. 61/593,202 filed Jan. 31, 2012 and entitled "METHODS FOR POWER SAVING IN DISCONTINUOUS RECEPTION-ADAPTIVE NEIGHBOR CELL SEARCH DURATION", which are incorporated herein by reference in their entirety.

This application is also related to U.S. Provisional Patent Application Ser. Nos. 61/585,207 entitled "Method for Power Saving in Discontinuous Reception of Wireless Receiver—Adaptive Wake-up" filed Jan. 10, 2012, 61/585,209 entitled "Method for Power Saving in Discontinuous Reception of Wireless Receiver—Staggered Measurement" filed Jan. 10, 2012, and 61/587,092 entitled "Method for Power Saving in Discontinuous Reception of Wireless Receiver—Adaptive Receiver Mode Selection" filed Jan. 16, 2012, each of the foregoing being incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure relates generally to the field of wireless communication and networks. More particularly, the present disclosure is directed, inter alia, to methods and apparatus for managing and improving power saving during discontinuous reception.

Other features and advantages of the present disclosure will immediately be recognized by persons of ordinary skill in the art with reference to the attached drawings and detailed description of exemplary embodiments as given below.

SUMMARY

The present disclosure satisfies for the aforementioned needs by providing, inter alia, improved methods and apparatus managing and improving power saving during discontinuous reception.

Firstly, a method for adaptively managing a parameter of a mobile device is disclosed. In one embodiment, the method includes: initializing a series of criteria, the series of criteria used at least in part to manage the parameter; obtaining measurements useful in the adaptive management of the parameter; comparing the measurements against respective ones of the series of criteria; determining based at least in part on the comparison if the parameter needs updating; and updating the parameter if it is determined that said parameter needs updating.

A mobile device having enhanced power management is disclosed. In one embodiment, the mobile device comprises a user equipment (UE) capable of operation within a cellular (e.g. LTE) network, and comprises logic configured to implement a parameter adjustment based on a series of criteria.

A computer readable apparatus is disclosed. In one embodiment, the apparatus comprises a storage medium having at least one computer program disposed thereon, the at least one program being configured to, when executed, implement management of discontinuous channel operation so as to enhance power saving within, e.g. a mobile device.

An integrated circuit (IC) is disclosed. In one embodiment, the integrated circuit comprises logic which is configured to implement management of discontinuous channel operation so as to enhance power saving within, e.g., a mobile device.

A wireless system is disclosed. In one embodiment, the system includes a plurality of base stations and a plurality of mobile user devices. The mobile user devices are configured to implement management of discontinuous channel operation so as to enhance power saving.

A method for adaptively managing a search duration of a mobile device is disclosed. In one embodiment the method includes establishing one or more sets of threshold values; establishing a set of search durations; providing at least one indication of one or more physical qualities of a communication signal; determining based at least on part of the one or more physical qualities if the at least one indication is within respective the one or more sets threshold values; and updating a search duration using the set of search durations based on the determination.

A base station apparatus capable of enhanced power management of mobile devices is disclosed. In one embodiment, the base station is configured to adaptively control the cell search duration of mobile devices within the cellular network so as to enhance power saving of the mobile devices.

Other features and advantages will immediately be recognized by persons of ordinary skill in the art with reference to the attached drawings and detailed description of exemplary embodiments as given below.

Figure 1:
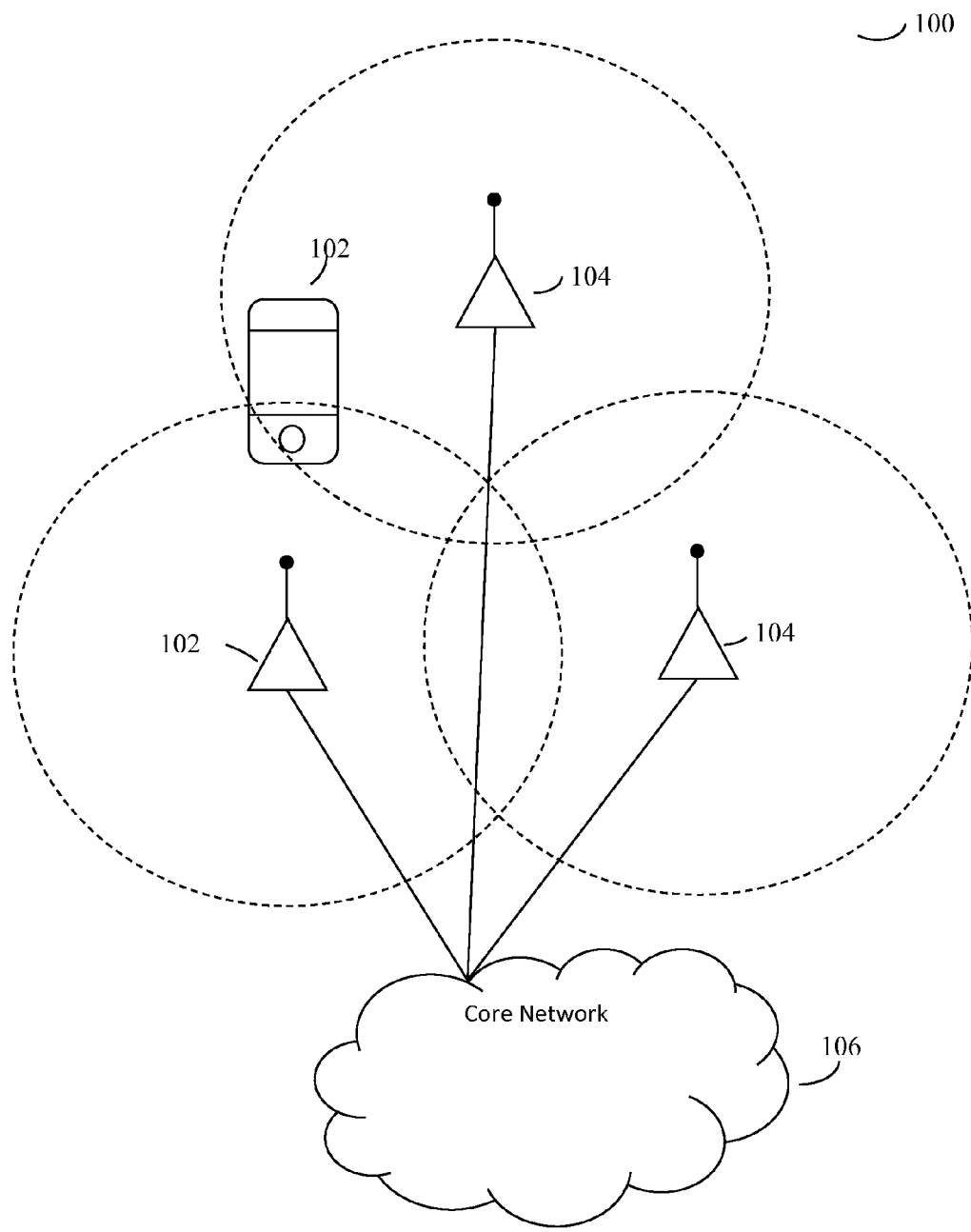
FIG. 1 is a graphical representation of one exemplary Long Term Evolution (LTE) cellular network useful with various aspects of the present disclosure.

All Figures© Copyright 2012-2013 Apple Inc. All rights reserved.

DETAILED DESCRIPTION

Reference is now made to the drawings, wherein like numerals refer to like parts throughout.

Exemplary embodiments of the present disclosure are now described in detail. While these embodiments are primarily discussed in the context of cellular networks including without limitation, third generation (3G) Universal Mobile Telecommunications System (UMTS) wireless networks, Worldwide Interoperability for Microwave Access (WiMAX), Long Term Evolution (LTE) wireless networks, and other fourth generation (4G) or LTE-Advanced (LTE-A) wireless networks, it will be recognized by those of ordinary skill that the present disclosure is not so limited. In fact, the various features of the disclosure are useful in and readily adapted to any wireless network that can benefit from the adaptive search procedures described herein.

Overview

In many existing cellular networks, the concept of discontinuous reception (DRX) has been utilized in order to save on power consumption and improve the battery life of wireless user equipment (UE) (e.g. cell phones, smartphones, tablets, etc.). DRX powers down most of the UE circuitry when there are no packets to be received or transmitted, and only wakes up the UE to listen to the network at specified times.

During DRX, one important task for the UE is to perform necessary measurements of neighbor cells for UE cell reselection in RRC_IDLE mode or reporting to the active base station (BS) for the BS's handover decisions in RRC_CONNECTED mode. However, neighbor cells have to be searched and detected before the measurements can be taken. The UE, upon entering a wake-up state, attempts to detect neighbor cells by performing synchronization attempts on the periodic samples of the sequences transmitted by the neighbor cells. The UE may perform repeated synchronization attempts in order to provide for higher reliability of detection of the neighbor cells. The process of repeating such attempts can contribute to a significant portion of UE wake-up time, requiring increased power consumption by the UE.

To address this and other problems, various embodiments of the present disclosure implement adaptive solutions, including for example adjusting the number of synchronization attempts, and/or the used samples, in order to detect neighbors based on physical layer metrics so as to provide adequate reliability of detection while minimizing the requisite power consumption by the UE.

Power Consumption and Management in Cellular Networks—

In the following discussion, a cellular radio system is described that includes a network of radio cells each served by a transmitting station, known as a cell site or base station (BS). The radio network provides wireless communications service for a plurality of user equipment (UE) transceivers. The network of BSs working in collaboration allows for wireless service which is greater than the radio coverage provided by a single serving BS. The individual BSs are connected to a Core Network, which includes additional controllers for resource management and in some cases access to other network systems (such as the Internet, other cellular networks, etc.).

FIG. 1 illustrates one exemplary Long Term Evolution (LTE) cellular network 100, with user equipments (UEs) 102, operating within the coverage of the Radio Access Network (RAN) provided by a number of base stations (BSs) 104. The LTE base stations are commonly referred to as "Enhanced NodeBs" (eNBs). The Radio Access Network (RAN) is the collective body of eNBs along with the Radio Network Controllers (RNC). The user interfaces to the RAN via the UE, which in many typical usage cases is a cellular phone or smartphone. However, as used herein, the terms "UE", "client device", and "user device" may include, but are not limited to, cellular telephones, smartphones (such as for example an iPhone™ manufactured by the Assignee hereof), personal computers (PCs), such as for example an iMac™, Mac Pro™, Mac Mini™ or MacBook™, and minicomputers, whether desktop, laptop, or otherwise, as well as mobile devices such as handheld computers, PDAs, personal media devices (PMDs), such as for example an iPod™, or any combinations of the foregoing.

Each of the eNBs 104 are directly coupled to the Core Network 106; e.g., via broadband access. Additionally, in some networks, the eNBs may coordinate with one another, via secondary access channels. The Core Network provides both routing and service capabilities. For example, a first UE connected to a first eNB can communicate with a second UE connected to a second eNB, via routing through the Core Network. Similarly, a UE can access other types of services e.g., the Internet, via the Core Network.

In order to reduce power consumption and improve the battery life of wireless user equipment (UE), certain wireless technologies implement so-called "discontinuous reception" (DRX) and "discontinuous transmission" (DTX). During DRX and DTX operation, the UE powers down most of the radio transceiver circuitry when there are no packets to be received or transmitted. The powered down components (in "sleep mode") are powered up ("wake-up", "warm-up") at designated time intervals to e.g., receive data from the network ("listening"). During wake-up, the UE needs to prepare the radio transceiver for reception by e.g., synchronizing the UE in time and frequency to the BS, allowing feedback loops to settle, etc. Use of DRX and DTX greatly improves device standby time, and can also provide significant reductions in power consumption during low-use scenarios.

DRX can be enabled in different network connection states; these network connection states include when the UE has a radio resource connection (RRC), and when the UE is idle. During connected mode DRX operation, the UE listens to downlink (DL) packets that follow a specific identifying pattern (e.g., packet header, etc.) that has been determined by the base-station (BS). In contrast, during idle mode DRX operation, the UE periodically looks for a paging message from the BS to determine if the UE needs to connect to the network and acquire the uplink (UL) timing. Within the exemplary context of LTE networks, DRX mode operation is specified for two distinct states: (i) RRC_CONNECTED, and (ii) RRC_IDLE.

In the RRC_CONNECTED state, DRX mode is enabled during an idle period of the downlink (DL) packet arrival. In the RRC_IDLE state, the UE must be paged for DL traffic (according to a paging schedule) or initiate uplink (UL) traffic by requesting a RRC connection with the serving eNB.

Currently, DRX and DTX techniques are used in several wireless technologies including, for example Universal Mobile Telecommunications System (UMTS), LTE (Long-term Evolution), and WiMAX (Worldwide Interoperability for Microwave Access). Incipient technologies will support very high data rates by using techniques that consume significant amounts of power during operation. Consequently, reducing transceiver use during inactivity will greatly improve overall transceiver power consumption. Existing schemes for DRX are controlled by the BS; i.e., the BS determines the times during DRX transmissions are sent from the BS to the UE; however, the UE independently manages its wake-up procedure to ensure that it will receive these DRX transmissions.

Additionally, during DRX mode, one important task is to perform necessary measurement of neighbor eNBs for UE cell reselection in RRC_IDLE state or reporting to the serving BS for the BS's handover decisions in RRC_CONNECTED state. Neighbor eNBs have to be searched and detected before measurements can be taken. The UE detects neighbor eNB based on synchronization signals sent periodically by the eNBs. The UE may perform repeated synchronization attempts to provide higher reliability in detecting neighbor eNBs. In DRX mode, the synchronization can contribute significantly to the UE wake time.

After the eNBs have been searched and detected, dependent on the radio access technology (RAT) of the eNBs being measured, there are four types of cell measurements performed by the exemplary UE. The first type of measurement is a serving-cell measurement, which is a measure of the signal strength of the serving cell that the UE is "camped" on. The serving-cell measurement is typically measured more often compared to other measurements. For example, in LTE, the serving-cell measurement is required to be measured at least once every DRX cycle.

The second type of measurement is the measurement of intra-frequency cells. This measurement is typically initiated by the when the serving cell's reference signal receive power (RSRP) or reference signal received quality (RSRQ) fall below their respective threshold.

The third measurement is the measurement of inter-frequency cell. The UE is required to detect and measure the relevant measurement quality for inter-frequency LTE neighbors based on network threshold configuration.

The fourth type of measurement is the measurement of inter-RAT cells. Inter-RAT cell measurement can take place if the quality of the serving cell/BS is above a high priority threshold, the UE search higher priority inter-RAT frequency layers with certain periodicity. If the serving cell quality is less than another threshold the UE searches and measures all inter-RAT cells on the configured measurement frequencies.

Methods—

Figure 2:
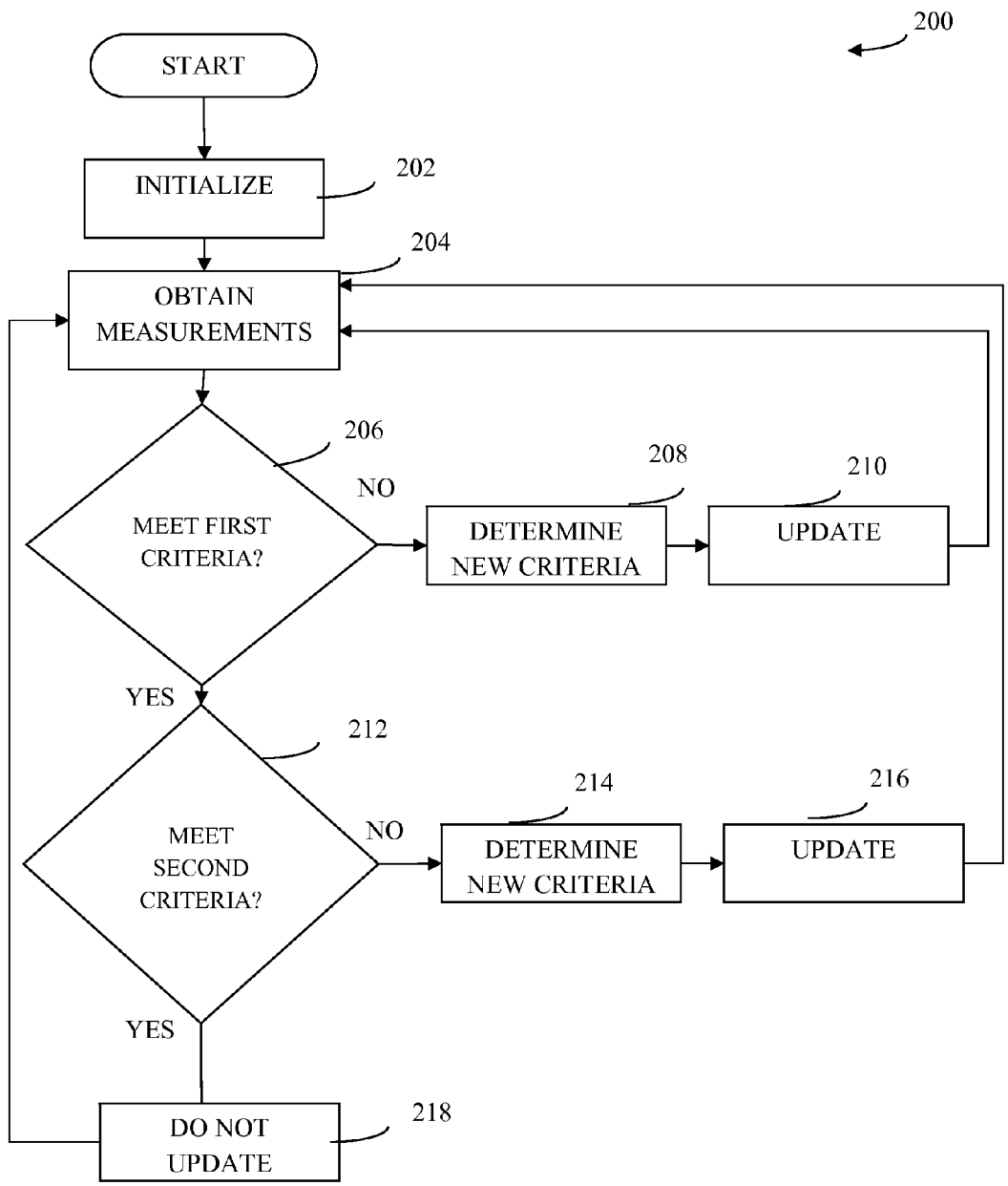
FIG. 2 is a logical flow diagram illustrating one embodiment of the generalized method of configuring physical parameters according to the present disclosure.

FIG. 2 illustrates one embodiment of a method 200 for improving power consumption during discontinuous reception using a physical channel metric according to the disclosure. The method adjusts a parameter (such as e.g., search window period) according to criteria associated with the physical channel(s) of the serving cell/base station (BS).

Referring to FIG. 2, at step 202 of the method 200, the UE initializes neighbor cell search parameters used to adaptively change the parameter of interest.

In the exemplary embodiment of FIG. 2, separate criteria are maintained for increasing or decreasing the parameter of interest. An advantage of maintaining separate criteria for increasing or decreasing the neighbor cell parameters is that if a measurement is consistently made around a particular criterion, it would be possible for the parameter (e.g., search duration) to frequently oscillate or dither between two search durations in implementations of only a single set of criteria for increasing or decreasing the parameter. By maintaining separate criteria, one can account for a sufficient increase or decrease in the measured value before changing the parameter.

Referring back to FIG. 2, at step 204, the UE will obtain (e.g., take itself, or receive from another source) physical layer measurements from a BS in communications range with the UE.

At step 206, the UE will determine if the physical layer measurements meet a/the first criterion/criteria. If the measured value meets the criterion, no adjustment in the neighbor cell parameter (e.g., search duration) is required and the method proceeds to step 212. If the criterion is not met, it is an indication that reliability of indentifying neighbor cells may be compromised using the current neighbor cell parameter, and that the parameter should be adjusted to provide adequate reliability. The new neighbor cell parameter(s) is/are determined in step 208.

At step 208, the UE will determine if the physical layer measurement meets the first criterion/criteria. After this determination has been made, the method proceeds to step 210.

At step 210, the UE will update the neighbor cell search parameters. After the neighbor cell search parameters have been updated, the UE may proceed back to step 204.

Proceeding to step 212, the UE will determine if the physical layer measurements meet a second criterion/criteria. If the measurement is meets the criterion, it is deemed to be of sufficient quality to adjust the parameter while maintaining a determined level of reliability in cell identification. The method then proceeds to step 214.

At step 214 of method 200, the UE will determine if the physical layer measurement meets the second criterion/criteria. If the criterion is met, then the method proceeds to step 216.

At step 216, the UE will update the neighbor cell search parameters. After the neighbor cell search parameters have been updated, the UE may proceed back to step 204.

At step 218, after a determination that the physical channel measurement did meet the first criterion (per step 236) and not the second criterion (per step 212), the UE does not update the neighbor cell parameter(s). The method then proceed back to step 204.

Figure 2A:
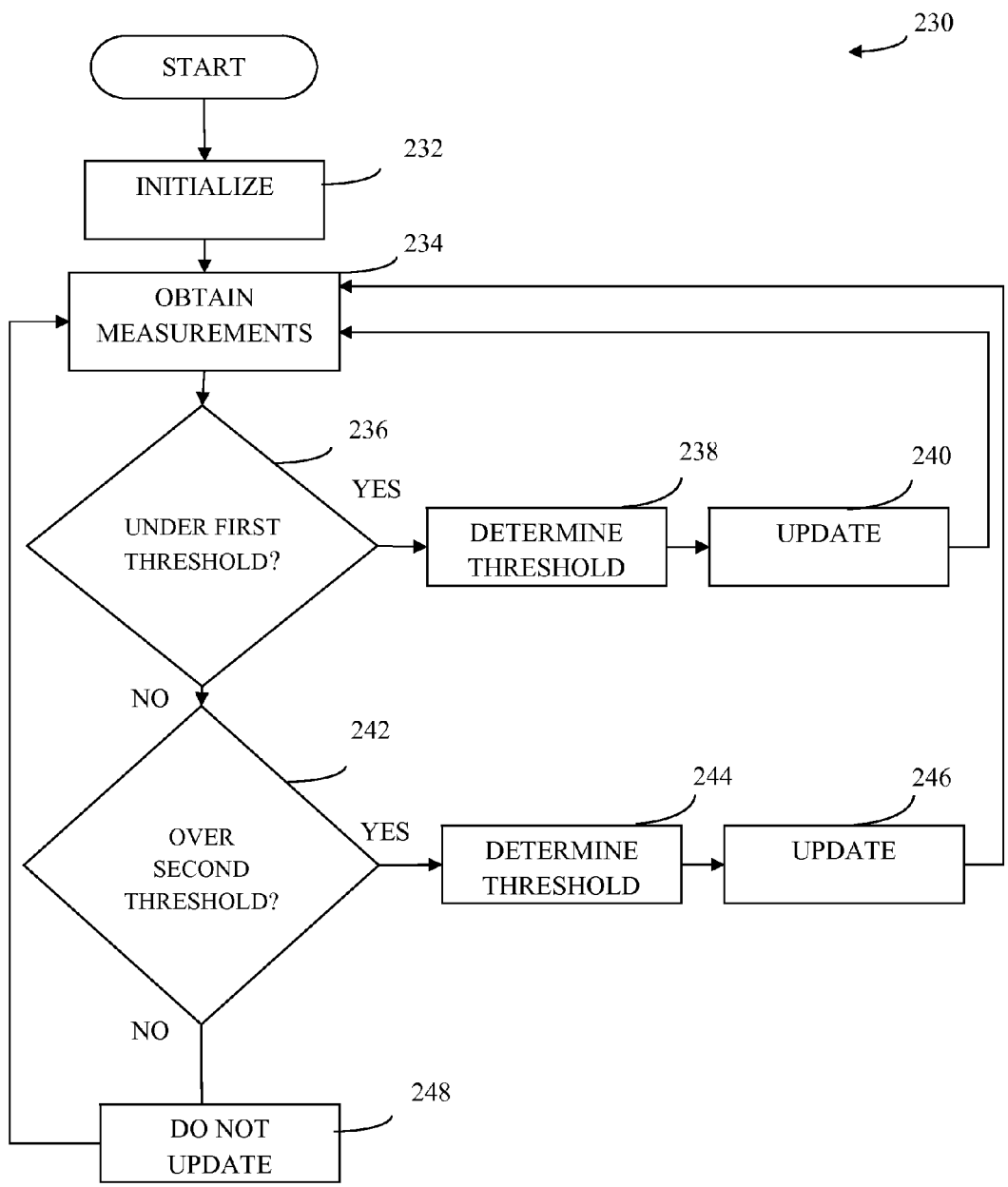
FIG. 2A is a logical flow diagram illustrating one exemplary implementation of the method of FIG. 2 in the context of search duration.

FIG. 2a illustrates one more specific embodiment 230 of the generalized method 200 for improving power consumption during discontinuous reception using a physical channel metric indicating signal strength and quality, according to FIG. 2. In one aspect, the method adjusts a search window period according to the quality of signal received from the serving cell/base station (BS). Specifically, a user equipment (UE) or other device can configure the search window duration for performing synchronization attempts with neighbor cells by comparing the Reference Signal Receive Quality (RSRQ) of the serving BS, as measured by the UE, against a variety of preset RSRQ threshold limits.

Referring to FIG. 2a, at step 232 of the method 230, the UE initializes neighbor cell search parameters used to adaptively change the search widow duration. In one such variant, a discrete set S, with a set size N, of possible neighbor cells search durations (NCSDUR) is selected in ascending order ranging from the shortest allowable NCSDUR time and the longest allowable NCSDUR time. In addition, two sets of RSRQ threshold values are established which indicate RSRQ values used in determining whether to increase or decrease the NCSDUR. The first set of RSRQ threshold values (RSRQ_Threshold$_{low}$) arranged in descending order are used to determine when the UE will select a particular NCSDUR of a longer duration than the current NCSDUR. The second set of RSRQ threshold values (RSRQ_Threshold$_{high}$) arranged in descending are used to determine when the UE will select a particular NCSDUR of a shorter duration compared to the current NCSDUR being used. Both RSRQ_Threshold$_{low}$ and RSRQ_Threshold$_{high}$ sets of threshold values have a set size of N−1, (i.e., set size one less than set size S). The index (i) of the sets are initialized at the first value of the set (i.e. i=0) according to Equation (1), Equation (2), and Equation (3) as set forth below.

$$NCSDUR=S(i); \qquad \text{(Equation 1)}$$

$$RSRQ_{low}=RSRQ\_Threshold_{low}(i); \qquad \text{(Equation 2)}$$

$$RSRQ_{high}=RSRQ\_Threshold_{high}(i); \qquad \text{(Equation 3)}$$

Figure 3:
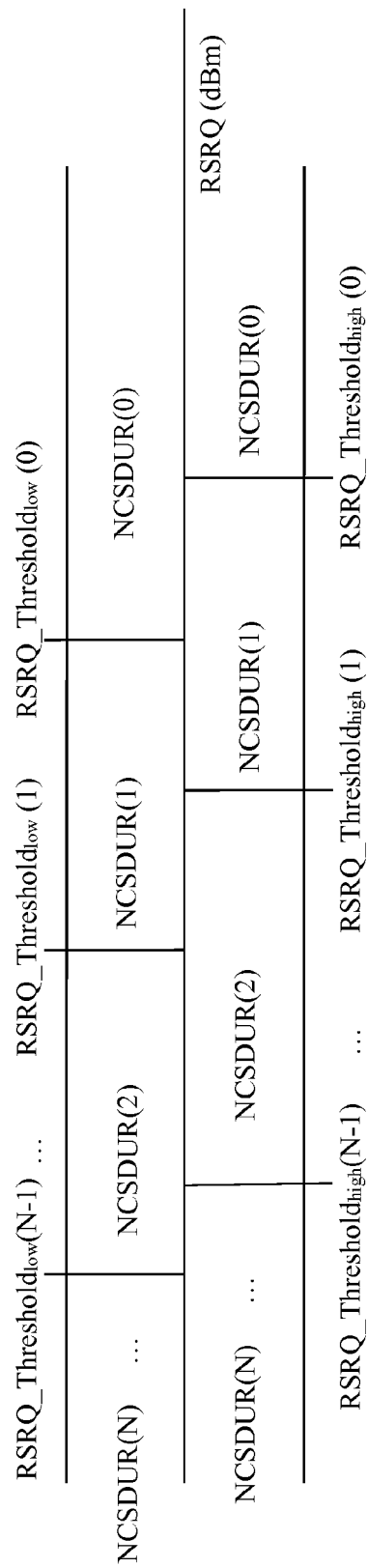
FIG. 3 is a graphical representation of one exemplary set first and second thresholds and durations according to the present disclosure.

FIG. 3 is a graphical illustration of the exemplary sets of NCSDUR, RSRQ_Threshold$_{low}$, and RSRQ_Threshold$_{high}$ values. In one variant of the method of the present disclosure, the RSRQ_Threshold$_{low}$, and RSRQ_Threshold$_{high}$ are sets of RSRQ threshold values in dBm, while NCSDUR are set in durations of milliseconds (ms). As noted above with respect to FIG. 2, an advantage of maintaining separate criteria (here, threshold values) for increasing or decreasing the neighbor cell search duration period is that if a RSRQ is consistently measured around a particular threshold value, it would be possible for the search duration to frequently oscillate or dither between two search durations in implementations of only a single set of thresholds for increasing or decreasing the search duration. By maintaining separate sets of threshold values, one can account for a sufficient increase or decrease in RSRQ before changing a search duration.

Referring back to FIG. 2a, at step 234, the UE will obtain (e.g., take itself, or receive from another source) physical layer measurements from a BS in communications range with the UE. In one embodiment, the UE will measure and calculate the RSRQ of the serving BS when the UE is in CONNECTED mode. As a brief aside, RSRQ is the ratio between the Reference Signal Received Power (RSRP) and the Received Signal Strength Indicator (RSSI). While RSRP is the average of the power of all the downlink reference signals (RS) across the entire bandwidth from a specific-cell to determine the signal strength of that respective cell, RSRP gives no indication of signal quality. The exemplary received signal strength indicator (RSSI) parameter is the total received signal power from the serving cell, including all interference and thermal noise. By comparing the RSRP against RSSI, RSRQ provides an indication of signal quality and power received from the serving BS. Thus, by the UE monitoring RSRQ, the adaptive neighbor cell search duration may account for both received signal power level of the serving base station and amount of received interference in decision making.

At step 236, the UE will determine if the physical layer measurements are within a first threshold. In one exemplary embodiment, the measured RSRQ is compared against RSRQ$_{low}$. If the RSRQ is a larger value than the RSRQ$_{low}$ threshold value, no increase in the neighbor cell search duration is required and the method proceeds to step 242. If the RSRQ is below RSRQ$_{low}$, it is an indication that reliability of indentifying neighbor cells may be compromised using the current neighbor search cell duration and that the duration should be increased to provide adequate reliability. The increase in neighbor cell search duration is determined in step 238.

At step 238, the UE will determine whether the physical layer measurement is located within in the first set of a range of thresholds. In one embodiment, the UE searches the set of RSRQ_Threshold$_{low}$ to find index i that satisfies Equation (4).

$$RSRQ\_Threshold_{low}(i+1)<RSRQ\leq RSRQ\_Threshold_{low}(i) \qquad \text{(Equation 4)}$$

By searching the set of RSRQ_Threshold$_{low}$ values, the UE can determine how many thresholds have been exceeded by the low RSRQ measurement in order to properly update the neighbor cell search duration window. If no value of i satisfies Equation (4), it is an indication that RSRQ is lower than lowest RSQP_Threshold$_{low}$ value, thus i is set to the lowest possible RSQP_Threshold$_{low}$ which is i=(N−1). Note that the NCSDUR will be set to main the longest possible duration in such an instance. After index i has been determined, the method proceeds to step 240.

At step 240, the UE will update the neighbor cell search parameters. In one embodiment, the UE will use the index value of i as determined per step 238 to update the neighbor cell search parameters. The search parameters NCSDUR, RSRQ$_{low}$, and RSRQ$_{high}$ are updated using Equation (1), Equation (2), and Equation (3) respectively. By updating the neighbor cell search parameters, the duration of the neighbor cell search is modified as well as updating the threshold values indicating when another adjusting of the cell search duration may be required. Thus by updating the neighbor cell search duration, the present disclosure advantageously ensures a minimal level of reliability in cell identification while reducing power consumption by avoiding unnecessarily long cell search durations. After the neighbor cell search parameters have been updated, the UE may proceed back to step 234.

Proceeding to step 242, the UE will determine if the physical layer measurements are within a second threshold. In one exemplary embodiment the measured RSRQ is compared against the value of RSRQ$_{high}$. If RSRQ is less than RSRQ$_{high}$, it is an indication that the RSRQ has not improved sufficiently enough to change the neighbor cell search to a shorter duration causing the method to proceed to step 248. If the RSRQ is greater than RSRQ$_{high}$, the RSRQ is deemed to be of sufficient quality to decrease the neighbor cell search duration window while maintaining a determined level of reliability in cell identification. After the determination that RSRQ is greater than RSRQ$_{high}$, the method proceeds to step 244.

At step 244 of method 230, the UE will determine where the physical layer measurement is located within the second set of thresholds. In one embodiment, the UE searches the set of RSRQ_Threshold$_{high}$ to find index i that satisfies Equation (5).

$$RSRQ\_Threshold_{high}(i)<RSRQ\leq RSRQ\_Threshold_{high}(i-1) \qquad \text{(Equation 5)}$$

By searching the set of RSRQ_Threshold$_{high}$ values, the UE can determine how many thresholds have been exceeded by the high RSRQ measurement in order to properly update the neighbor cell search duration window. If no value of i satisfies Equation (5), it is an indication RSRQ is larger than the largest value of RSRQ_Threshold$_{high}$. In such an instance, index i is determined to be the highest RSRQ_Threshold$_{high}$ value which is i=0. After the value of index i has been determined, the method proceeds to step 246.

At step 246, the UE will update the neighbor cell search parameters. In one embodiment, the UE will use the index value of i as determined per step 244 to update the neighbor cell search parameters. The search parameters NCSDUR, RSRQ$_{low}$, and RSRQ$_{high}$ are updated using Equation (1), Equation (2), and Equation (3) respectively. After the neighbor cell search parameters have been updated, the UE may proceed back to step 234.

At step 248, after a determination that the physical channel measurement were not within a first threshold (per step 236) and not within a second threshold (per step 242), the UE does not update the neighbor cell search parameters. In one embodiment, the UE will reuse the stored values of NCSDUR, RSRQ$_{low}$, and RSRQ$_{high}$ and then proceed back to step 234.

In an alternate embodiment, the UE retains the last used value of index i and reinitializes NCSDUR, RSRQ$_{low}$, and RSRQ$_{high}$ using Equation (1), Equation (2), Equation (3) respectively. After the aforementioned parameters have been reinitialized, the UE may proceed back to step 234.

Exemplary Neighbor Cell Search Duration Operation—

Consequently, in one exemplary aspect of the present disclosure, a scheme for improving the neighbor cell search procedure is disclosed that adaptively adjusts the relevant parameter(s) (e.g., neighbor cell search duration) based on measured physical channel characteristics. While existing solutions for the neighbor parameters (e.g., cell search durations) are based on predetermined timers, one exemplary embodiment of the present disclosure adaptively adjusts the neighbor cell search duration based on key performance metrics such as reference signal receive power (RSRP), received signal strength indication (RSSI), signal to interference and noise ratio (SINR), and received block error rate (BLER) of the serving BS, as well as the SNR of primary synchronization sequence (PSS) and the secondary synchronization sequence (SSS) from both the serving BS as well as previously detected neighbor cells.

Before addressing the specifics of adaptive neighbor cell search, various components and procedures useful in conjunction with various embodiments of the present disclosure are now discussed in greater detail.

Discontinuous Reception and Transmission (DRX/DTX)—

Figure 4:
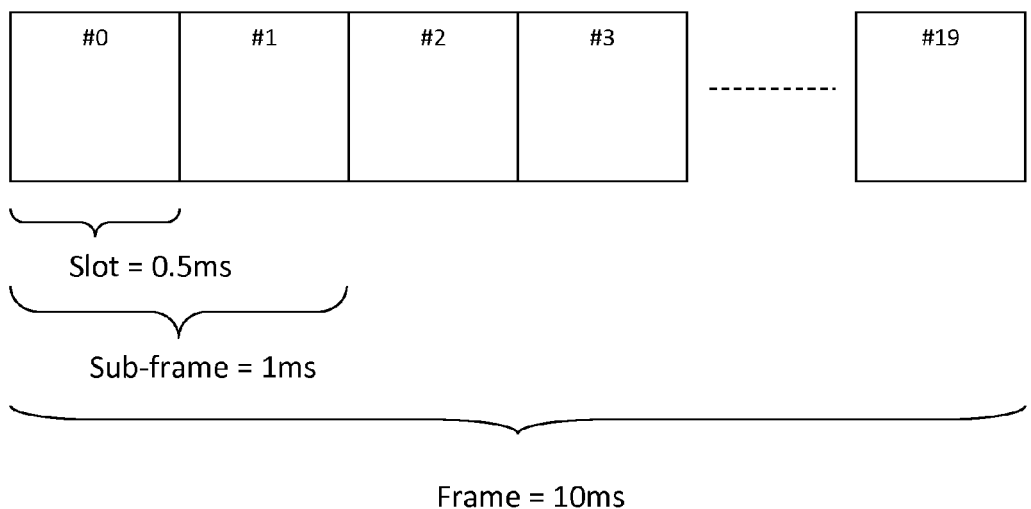
FIG. 4 is a graphical representation of a LTE radio frame useful with various aspects of the present disclosure.

The Enhanced NodeB (eNB) of the present disclosure controls DRX operations using various timers and/or parameters that are communicated to the user equipment (UE). As a brief aside, LTE communications are conducted according to a time schedule that includes frames, subframes, and slots. One such exemplary LTE frame 400 is illustrated in FIG. 4.

When the UE has a radio resource connection, the UE can be allocated one or more time slots for communication. If a UE is enabled for DRX operation in RRC connected mode, the UE will wake-up and sleep in accordance with its resource allocations. During RRC idle mode, the UE does not have a radio resource connection. The UE will periodically wake-up to see if it is being paged within a frame of data. If the frame does not have a page for the UE, the UE will go back to sleep.

In connected mode DRX (DRX performed during the RRC_CONNECTED state), a DRX inactivity timer indicates the time in number of consecutive subframes to wait before enabling DRX.

Additionally, DRX operation is split into short cycles and long cycles. Short DRX cycles and long DRX cycles allow the eNB to adjust the DRX cycles based on ongoing application activity. For example, a UE may initially be placed in a short DRX cycle during brief lulls in activity. A DRX short cycle timer determines when to transition to the long DRX cycle; i.e., if the DRX short cycle timer expires without any UE activity, the UE transitions to the long DRX cycle which further reduces power consumption.

If no new packets are transmitted for an extended period of time after successfully receiving a packet (unsuccessful packet reception indicates a fading/broken connection which is handled with recovery/reconnection procedures), the eNB may release the RRC connection. Once the UE transitions into RRC IDLE state, idle mode DRX is enabled.

In idle mode DRX (DRX performed during the RRC_IDLE state), an ON duration timer determines the number of frames the UE can sleep through before reading the downlink (DL) control channel. Commonly used values for the ON duration timer are 1, 2, 3, 4, 5, 6, 8, 10, 20, 30, 40, 50, 60, 80, 100, and 200. During idle mode DRX, the UE only needs to monitor one paging occasion (PO) per DRX cycle, which is one subframe. The idle DRX cycles are 320 ms, 640 ms, 1.28 s, and 2.56 s.

Cell Search and Selection

Before neighbor cell measurements can be made, the UE needs to detect and synchronize to the neighbor cells by acquiring the known synchronization sequences that are transmitted periodically from the eNBs. In LTE, there are two synchronization sequences that are transmitted; the primary synchronization sequence (PSS) and the secondary synchronization sequence (SSS).

Figure 4A:
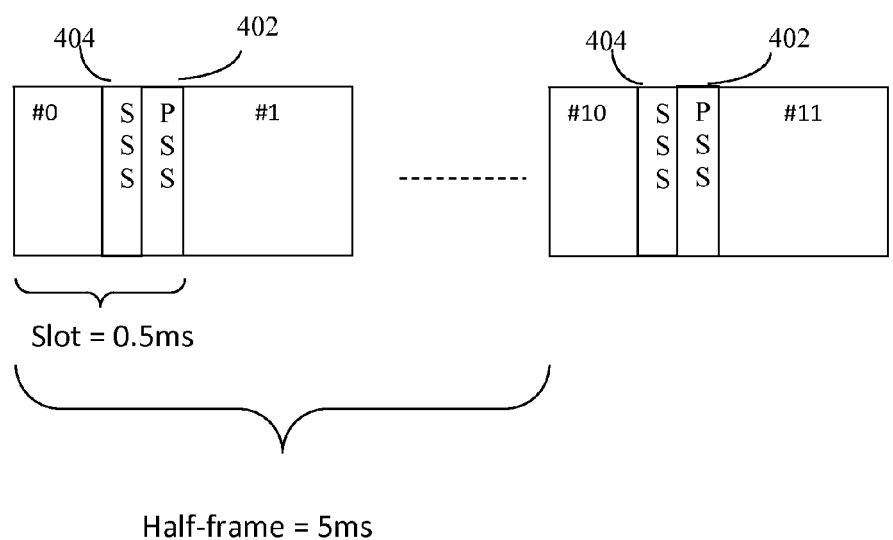
FIG. 4A is a graphical representation of a LTE radio frames including synchronization sequences useful with various aspects of the present disclosure.

Now referring to FIG. 4A, a radio frame structure showing the configuration of the synchronization signals is illustrated. The PSS 402 is formed by a frequency domain Zadoff Chu sequence with specified root indices. The PSS specifies the Physical Layer ID of the cell. The PSS is transmitted in last OFDM symbol of the first time slot of the first subframe (i.e. subframe 0). The location of the PSS enables the UE to acquire the slot boundary independent from the cyclic prefix. In the exemplary illustration, the PSS is transmitted twice per radio frame and is repeated in subframe 5 (i.e. slot 10). By transmitting the PSS in subframe 0 and 5, the PSS is separated by a half frame thus enabling the UE to synchronize on the 5 ms basis of the half frame. After the UE determines the 5 ms timing, the UE proceeds to determine the radio frame timing and the cell's group identity via the SSS 404.

The SSS has a 5 ms periodicity and is transmitted in the symbol before the PSS. The SSS is formed by interleaving two binary sequences in the frequency domain. In LTE, the SSS consists of 168 different sequences to identify the physical layer cell identity group. By ascertaining the physical layer identity, of the PSS, and the cell identity group, of the SSS, the physical layer cell identity can be determined to identity a particular eNB.

Figure 5:
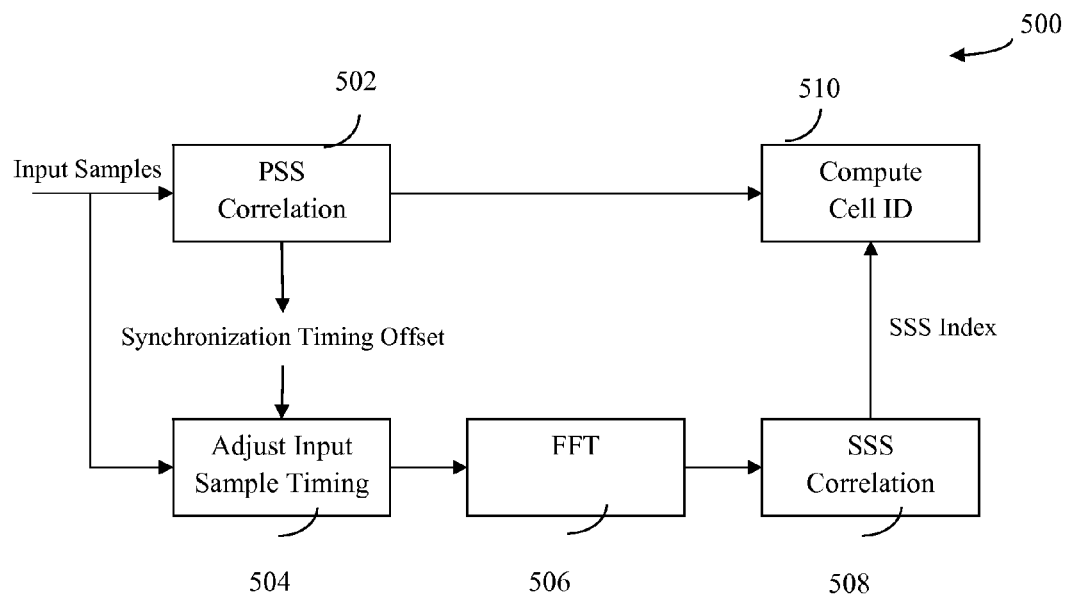
FIG. 5 is a logical block diagram of a generalized correlation mechanism to detect synchronization signal useful with various aspects of the present disclosure.

Referring now to FIG. 5, FIG. 5 illustrates an exemplary correlation mechanism 500 for determining a cell's identification. In a mobile wireless channel, the received signal level may be adversely impacted due to fading. Thus, in order to improve the reliability of detection, the UE can use PSS/SSS samples from one or more half-frames to acquire the synchronization to use the time diversity present in fading channels. Increasing the number of half-frames for acquisition improves the reliability of detection. However, increasing the number of half-frames may also increase the duration of the UE's DRX wake-up time and thus increases power consumption.

At block 502, PSS correlation is performed on input samples received from the periodic eNB transmissions. The PSS correlation provides a timing estimate based on the 5 ms periodicity of the PSS transmission in order to determine a synchronization timing offset. In addition, the PSS Physical Layer ID of the eNB is derived from the input sample(s). At block 504, the synchronization timing offset is used to adjust the input sample timing. By adjusting the input sample timing, a Fast Fourier Transform (FFT) may be performed at block 506, in order to derive the SSS of the input sample. At block 508, multiple SSS samples are correlated in order to derive the Cell Identity Group value. After both the Physical Layer ID and Cell Identity Group have been determine, the physical cell identity can be computed in block 510.

Example Operation—

During neighbor cell search and selection, increasing the neighbor cell search duration my increase both reliability of the detection and acquisition of a cell as well as the wake time in DRX. Since the objective of neighbor cell search is to detect neighbors to eventually reselect/handover, the reliability of detecting neighbor cells becomes more critical in scenarios where this is a high probability of relatively strong neighbor cells which have similar receive signal strength as the serving cell. Hence in the scenarios where there is a low probability of having neighbor cells, the search and corresponding awake time can be kept at a minimum, or that the neighbor cell search can be turned off all together. Thus, it is important to be able to have a means to predict how likely it is that neighbor cells are present in a give situation.

It is recognized that in certain embodiments or implementations, physical layer metrics of a wireless channel may provide a good indication of how likely a neighbor cell may be present. For instance, if the reference signal receive power (RSRP) of the serving BS is very low, it is a possible indication that neighbor cells are present. For example, if a serving BS has a very low reported RSPR, the UE should be able to find a new cell to camp on with better RSRP or the serving BS should have initiated a handover decision to cell with a better RSRP assuming on an adequately designed cellular network. Furthermore, if there is a high level of received signal strength indication (RSSI) as compared to RSRP, it is an indication that the large amount of interference can be attributed to the presence of a neighbor cell(s). As received signal received quality (RSRQ) is a ratio of RSRP as compared to RSSI, RSRQ provides a good indication of the presence of neighbor cells. In addition, if the received signal to interference and noise ratio (SINR) is low and the RSRP is significantly large, then there is a strong likelihood the neighbor cells are deteriorating the SINR. Additionally, if the received block error rate (BLER) is large in a scenario where the modulation and coding schemes are robust, and the RSRP is large, it is a strong indication that neighbor cells are creating interference to deteriorate received performance.

The wireless mobile cellular channel allows for a large number of scenarios where a number of the aforementioned conditions may occur. Hence, an adaptive algorithm can use the physical layer metrics to determine the duration of a neighbor cell search while conserving battery life by spending minimal amount of search time when it is not necessary. Furthermore, a combination of these physical layer metrics can help in optimizing the search time. In instances of a high probability of neighbor cells, such as in the cases of poor signal quality of a serving BS (e.g. very low RSRP, or BLER with high RSRP) of high interference, the search window may be increased to improve reliability of detecting neighbor cells. In instances where there is a low probability of neighbor cell (e.g. low interference conditions), the search window can be kept small as increased reliability is unnecessary.

Figure 6:
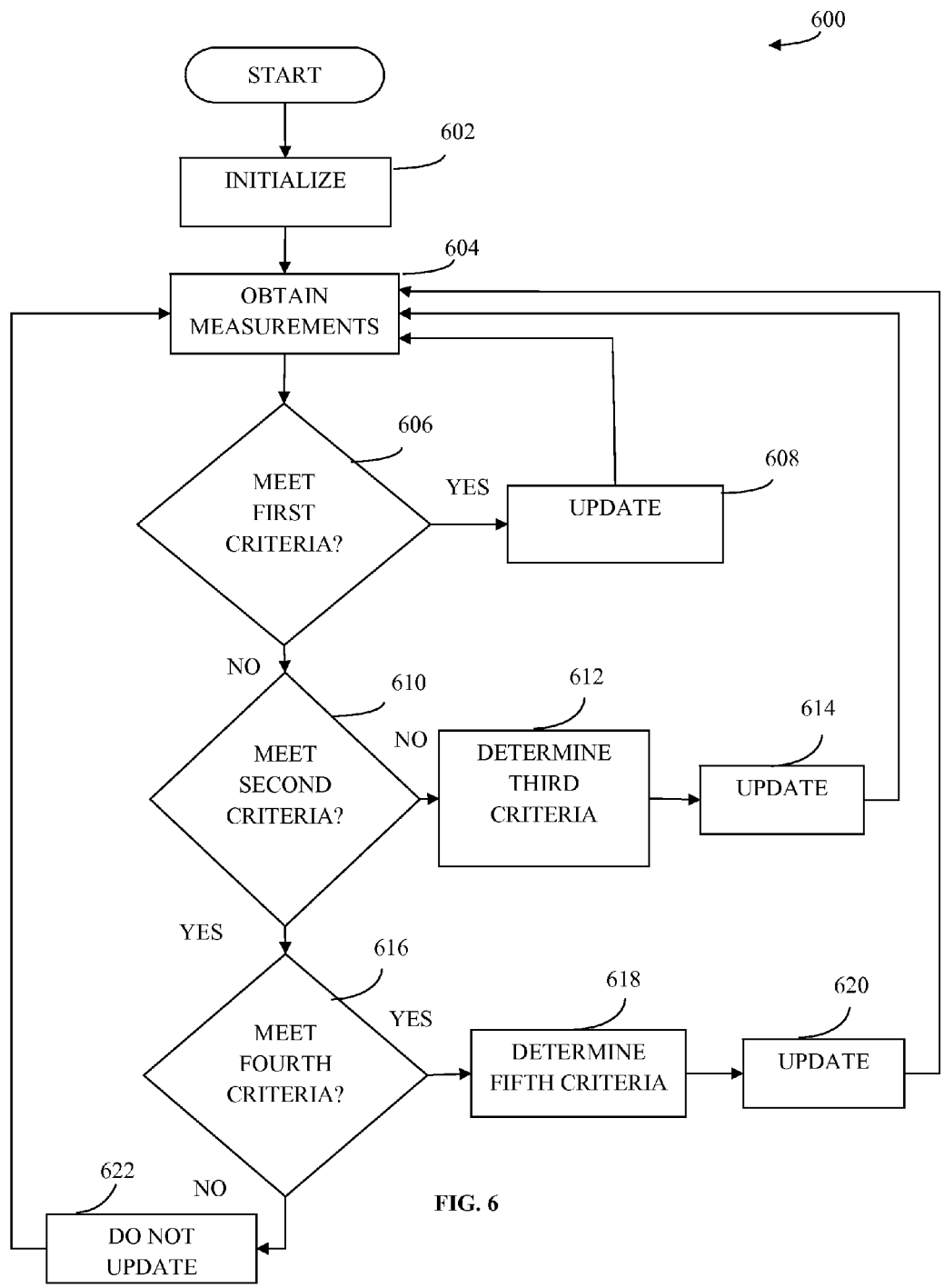
FIG. 6 is a logical flow diagram illustrating one embodiment of the generalized method of improving power consumption during discontinuous reception according to the present disclosure.

Referring now to FIG. 6, an exemplary generalized 600 method for improving power consumption during discontinuous reception using multiple physical channel metrics is shown and described. In one aspect, the method analyzes the quality of first metrics transmitted by neighbor cells and the serving BS, as well as one or more quality-related parameters from the serving BS.

At step 602, the UE initializes neighbor cell search parameters useful in adaptively adjusting the neighbor cell parameters (such as e.g., search duration, as in the example of FIG. 2a).

At step 604, the UE obtains physical layer metrics associated with a serving BS and any neighbor cells. After all the necessary measurements and any calculations have been performed, the method proceeds to step 606.

At step 606 of method 600, the UE determines if the quality of the first metrics (e.g., identification sequence) meets a first criterion. If the criterion/criteria is satisfied, the method proceeds to step 608; if not satisfied, the method proceeds to step 610.

At step 608, negative effects on the reliable detection of neighbor cells due to interference is determined to be likely, and the relevant parameter(s) updated. After the neighbor cell parameters have been updated, the method may proceed back to step 604.

At step 610, the UE will determine if the physical layer measurements meet second criteria. If the criterion is not met, it is an indication that reliability of indentifying neighbor cells may be compromised using the current neighbor search parameter(s), and that the parameter(s) should be adjusted to provide adequate reliability. The necessary adjustment is determined in step 612.

At step 612, the UE will determine if the physical layer measurement meets a third criterion, and if an adjustment is necessary. After any necessary adjustment has been determined, the method proceeds to step 614.

At step 614, the UE will update the neighbor cell search parameters. After the neighbor cell search parameters have been updated, the UE may proceed back to step 604.

Proceeding to step 616, the UE will determine if the physical layer measurements meet a fourth criterion. If the measurement(s) is/are deemed to be of sufficient quality to adjust the relevant search parameter while maintaining a determined level of reliability in cell identification, the method proceeds to step 618.

At step 618, the UE will determine if the physical layer measurements meet a fifth criterion. After the relevant adjustment has been determined, the method proceeds to step 620.

At step 620, the UE will update the neighbor cell search parameters. After the neighbor cell search parameters have been updated, the UE may proceed back to step 604.

At step 622, after a determination that the physical channel measurement did not meet the second criterion (per step 610) or third criterion (per step 616), the UE does not update the neighbor cell search parameters.

Figure 6A:
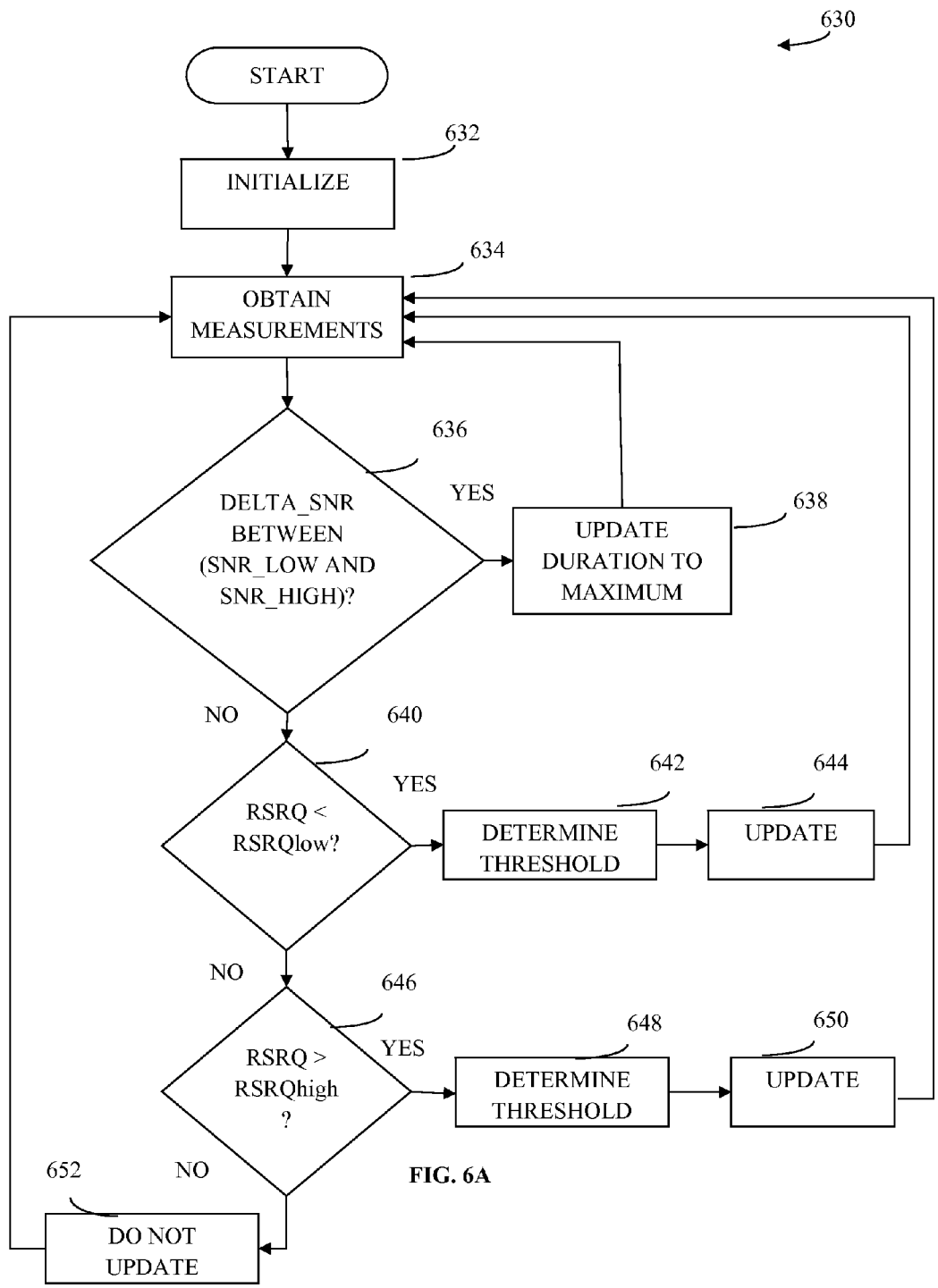
FIG. 6A is a logical flow diagram illustrating one exemplary implementation of the method of FIG. 6.

Now referring to FIG. 6a, an exemplary implementation of the method 630 for improving power consumption during discontinuous reception using multiple physical channel metrics of FIG. 6 is shown and described. In one aspect, the method analyzes the quality of identification sequences transmitted by neighbor cells and the serving BS as well as the signal quality from the serving BS. Specifically, a UE adjusts a neighbor cell search duration based on a physical layer measurement indicative of inter-cell interference. In addition, a UE may adjust the neighbor cell search duration based on a comparison of the RSRQ measurement of the serving BS against a variety of thresholds.

At step 632, the UE initializes neighbor cell search parameters useful in adaptively adjusting the neighbor cell search duration. A set S of neighbor cell search durations (NCSDUR) are selected of N number of NCSDUR arranged in ascending order from a minimum NCSDUR to a maximum NCSDUR. In addition, two sets of threshold are determined with a set size of N-1. The first set is RSRQ_Threshold$_{low}$ which is a set of thresholds for determining when the neighbor cell search duration should be increased. The second set is RSRQ_Threshold$_{high}$ which is a set of thresholds for determining when the neighbor cell search duration should be decreased. Both of the aforementioned sets are arranged in descending order of largest value to lowest value. The UE initializes the parameters of NCSDUR, RSRQ$_{low}$, and RSRQ$_{high}$ in accordance with Equation (1), Equation (2), and Equation (3), respectively. Additionally, a pair of threshold parameters useful in comparing the difference between signal-to-noise ratio (SNR) of identification signals of a serving BS and a neighbor cell are determined. The first threshold parameter is SNR_Threshold$_{low}$ and the second threshold is SNR_Threshold$_{high}$. SNR_Threshold$_{low}$ and SNR_Threshold$_{high}$ define a range of SNR values indicative of substantial likelihood of interference between the neighbor cell and the serving BS. In an exemplary variant, multiple sets of SNR_Threshold values may be defined as multiple sets of values. For example, sets of SNR_Threshold values may be used based on the cell search window duration.

At step 634, the UE will obtain physical layer metrics relating to a serving BS and any neighbor cells. In one exemplary embodiment, the UE will measure and calculate the RSRQ of the serving BS as well as calculate the SNR of both the primary synchronization sequence (PSS) and the secondary synchronization sequence (SSS). In addition, the UE will calculate the PSS/SSS SNRs for any detectable neighbor cells during the neighbor cell search window. Upon determining the PSS/SSS SNRs of the serving BS (SNR$_{serving}$) and neighbor cells (SNR$_{neighbor}$), ΔSNR is calculated in accordance with Equation (6).

$$\Delta SNR = SNR_{neighbor} - SNR_{serving} \qquad \text{(Equation 6)}$$

In one variant, SNR$_{serving}$ and SNR$_{neighbor}$ are based solely on the PSS SNR. In an alternate variant, SNR$_{serving}$ and SNR$_{neighbor}$ are determined solely from SSS SNR. In yet another implementation, SNR$_{serving}$ and SNR$_{neighbor}$ are calculated based on a combination of PSS/SSS SNRs. After all the necessary measurements and calculation have been performed, the method proceeds to step 636.

At step 636 of method 630, the UE determines if the identification sequence quality is within a threshold range. In one embodiment, the UE determines if ΔSNR is between the range SNR_Threshold$_{low}$ and SNR_Threshold$_{high}$. (See Equation (7))

$$SNR\_Threshold_{low} < \Delta SNR < SNR\_Threshold_{high} \qquad \text{(Equation 7)}$$

As discussed supra, SNR_Threshold$_{low}$ and SNR_Threshold$_{high}$ define a range which indicates a probability of a neighbor cell and a serving BS are substantially interfering with each other based on a similar level of signal strength. A ΔSNR which is lower than the SNR_Threshold$_{low}$ is an indication the signal from the serving BS is much stronger than the neighbors, or if the neighbors are too far to detect causing the signal strength of the neighbors to be too weak to consider for measurements. On the other hand, when ΔSNR is larger than SNR_Threshold$_{high}$, there is an indication that the neighbor cell is sufficiently stronger signal than the serving BS, increasing the probability of reliably detecting the neighbor cell. Thus the neighbor cell search duration may possibly be decreased while maintain the requisite reliability in detecting neighbors. If ΔSNR satisfies the condition of Equation (7), the method proceeds to step 638. If ΔSNR does not satisfy Equation (7), the method proceeds to step 640.

Proceeding to step 638, the SNR between a neighbor cell and serving BS has been determined to be too close in regards to signal strength, therefore negatively effecting reliable detection of neighbor cells due to interference. In one embodiment, the UE will update the NCSDUR to the longest possible search duration in an effort to increase reliability of detection. Thus Equation (1) will set NCSDUR with i=N (i.e. the largest duration) while RSRQ$_{low}$ and RSRQ$_{high}$ will be set in accordance with Equation (2) and Equation (3) using i=N-1 (i.e. the smallest threshold values). After the neighbor cell search parameters have been updated, the method may proceed back to step 634.

At step 640, the UE will determine if the physical layer measurements are within a first threshold. In one exemplary embodiment, the measured RSRQ is compared against RSRQ$_{low}$. If the RSRQ is a larger value than the RSRQ$_{low}$ threshold value, no increase in the neighbor cell search duration is required and the method proceeds to step 646. If the RSRQ is below RSRQ$_{low}$, it is an indication that reliability of indentifying neighbor cells may be compromised using the current neighbor search cell duration and that the duration should be increased to provide adequate reliability. The increase in neighbor cell search duration is determined in step 642.

At step 642, the UE will determine if the physical layer measurement is located within in the first set of a range of thresholds. In one embodiment, the UE searches the set of RSRQ_Threshold$_{low}$ to find index i that satisfies Equation (4). If no value of i satisfies Equation (4), it is an indication that RSRQ is lower than lowest RSQP_Threshold$_{low}$ value, thus i is set to the lowest possible RSQP_Threshold$_{low}$ which is i=(N-1). Note that the NCSDUR will be set to main the longest possible duration in such an instance. After index i has been determined, the method proceeds to step 644.

At step 644, the UE will update the neighbor cell search parameters. In one embodiment, the UE will use the index value of i as determined per step 642 to update the neighbor cell search parameters. The search parameters NCSDUR, RSRQ$_{low}$, and RSRQ$_{high}$ are updated using Equation (1), Equation (2), and Equation (3) respectively. After the neighbor cell search parameters have been updated, the UE may proceed back to step 634.

Proceeding to step 646, the UE will determine if the physical layer measurements are within a second threshold. In one exemplary embodiment the measured RSRQ is compared against the value of RSRQ$_{high}$. If RSRQ is less than RSRQ$_{high}$, it is an indication that the RSRQ has not improved sufficiently enough to change the neighbor cell search to a shorter duration causing the method to proceed to step 622. If the RSRQ is greater than RSRQ$_{high}$, the RSRQ is deemed to be of sufficient quality to decrease the neighbor cell search duration window while maintaining a determined level of reliability in cell identification. After the determination that RSRQ is greater than $RSRQ_{high}$, the method proceeds to step 648.

At step 648, the UE will determine if the physical layer measurements are located within the second set of thresholds. In one embodiment, the UE searches the set of $RSRQ\_Threshold_{high}$ to find index i that satisfies Equation (5). If no value of i satisfies Equation (5), it is an indication RSRQ is larger than the largest value of $RSRQ\_Threshold_{high}$. In such an instance, index i is determined to be the highest $RSRQ\_Threshold_{high}$ value which is i=0. After the value of index i has been determined, the method proceeds to step 650.

At step 650, the UE will update the neighbor cell search parameters. In one embodiment, the UE will use the index value of i as determined per step 618 to update the neighbor cell search parameters. The search parameters NCSDUR, $RSRQ_{low}$, and $RSRQ_{high}$ are updated using Equation (1), Equation (2), and Equation (3) respectively. After the neighbor cell search parameters have been updated, the UE may proceed back to step 634.

At step 652, after a determination that the physical channel measurement where not within a first threshold (per step 640) and not within a second threshold (per step 646), the UE does not update the neighbor cell search parameters. In one embodiment, the UE will reuse the stored values of NCSDUR, $RSRQ_{low}$, and $RSRQ_{high}$ and then proceed back to step 644.

Apparatus—

Figure 7:
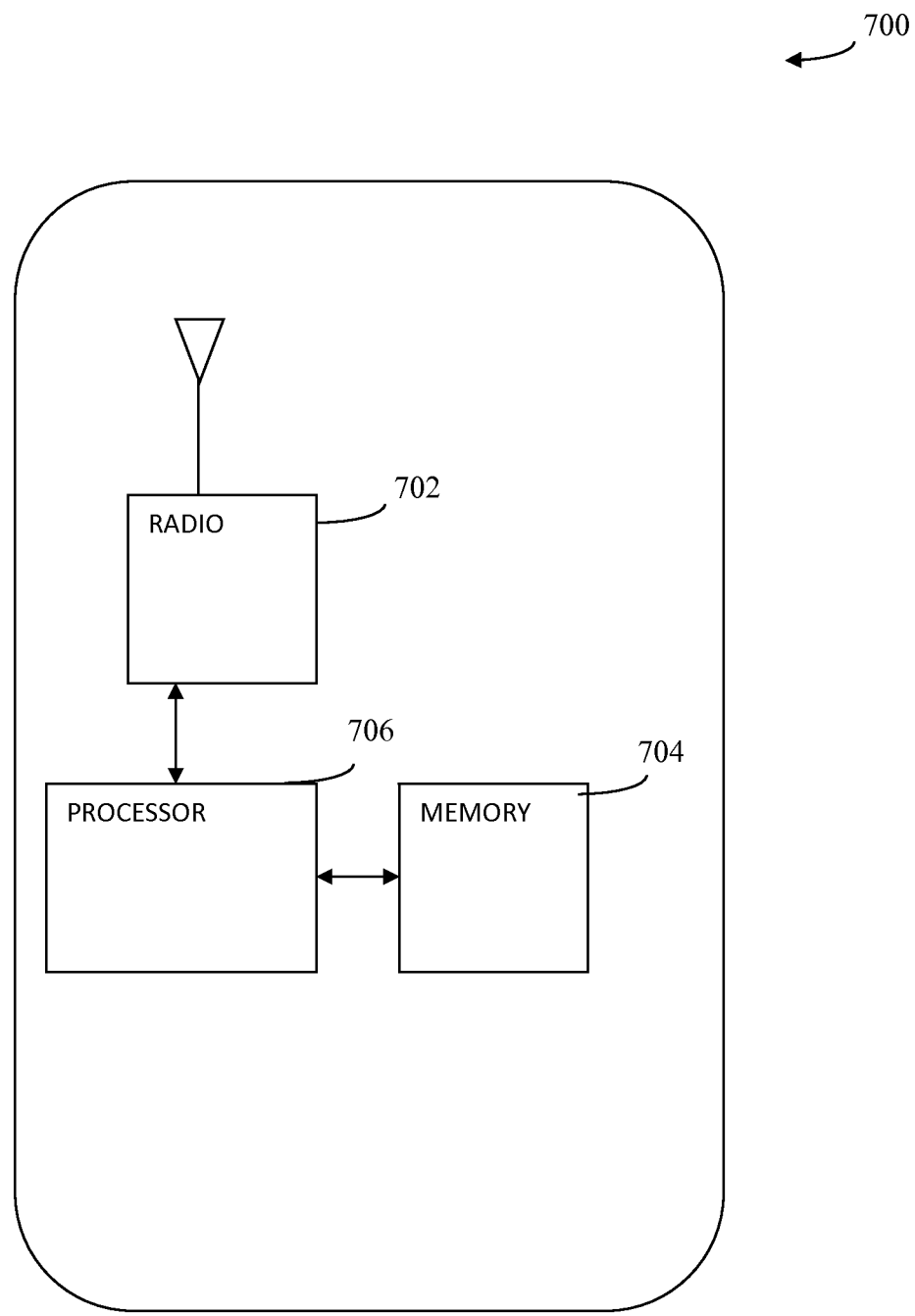
FIG. 7 illustrates one embodiment of an apparatus in accordance with the present disclosure.

Referring now to FIG. 7, an exemplary user device apparatus 700 with enhanced power consumption during discontinuous reception is illustrated. While one specific device configuration and layout is shown and discussed herein, it is recognized that many other configurations may be readily implemented by one of ordinary skill given the present disclosure, the apparatus 700 of FIG. 7 being merely illustrative of the broader principles of the present disclosure.

The apparatus 700 of FIG. 7 includes one or more radio transceivers 702, a computer readable memory 704, and a processing subsystem 706.

The processing subsystem 706 includes one or more of central processing units (CPU) or digital processors, such as a microprocessor, digital signal processor, field-programmable gate array, RISC core, or plurality of processing components mounted on one or more substrates. The processing subsystem is coupled to computer readable memory 904, which may include for example SRAM, FLASH, SDRAM, and/or HDD (Hard Disk Drive) components. As used herein, the term "memory" includes any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM. The processing subsystem may also comprise additional co-processors, such as a dedicated graphics accelerator, network processor (NP), or audio/video processor. As shown processing subsystem 706 includes discrete components; however, it is understood that in some embodiments they may be consolidated or fashioned in a SoC (system-on-chip) configuration.

The processing subsystem 706 is adapted to receive one or more data streams from a radio transceiver 702. The radio transceiver in this exemplary embodiment generally comprises a cellular radio transceiver with one or more components with the ability to adjust the neighbor cell search duration.

Myriad other schemes for adaptive neighbor cell search duration will be recognized by those of ordinary skill given the present disclosure. It will be appreciated that while certain features of the present disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the present disclosure is disclosed and claimed herein.

While the above detailed description has shown, described, and pointed out novel features of the present disclosure as applied to various embodiments, it will be understood that various omissions, substitutions, and changes in the form and details of the device or process illustrated may be made by those skilled in the art without departing from the present disclosure. The foregoing description is of the best mode presently contemplated of carrying out the disclosure. This description is in no way meant to be limiting, but rather should be taken as illustrative of the general principles of the disclosure. The scope of the disclosure should be determined with reference to the claims.

What is claimed is:

1. A mobile device configured to operate in a discontinuous reception mode, the mobile device comprising:
   a processor;
   at least one wireless interface in data communication with the processor;
   logic in data communication with the processor and the at least one wireless interface, the logic configured to:
      obtain a plurality of physical layer metrics of a serving base station and of one or more neighbor cells;
      compare first metrics of the obtained plurality of physical layer metrics against a plurality of thresholds, wherein said comparing comprises calculating a difference between a first metric of the obtained plurality of physical layer metrics of the serving base station and the first metric of the obtained plurality of physical layer metrics of the one or more neighbor cells and comparing the difference against the plurality of thresholds; and
      based on the comparison, adjust a neighbor cell search duration parameter.

2. The mobile device of claim 1, wherein said comparing the first metrics of the obtained plurality of physical layer metrics against a plurality of thresholds further comprises:
   comparing a first metric of the obtained plurality of physical layer metrics against a current first and second threshold of a plurality of respective first and second sets of thresholds of the plurality of neighbor cell search parameters; and
   in response to determining that the first metric is outside of the first and second thresholds, update the current first and second thresholds to new first and second thresholds of the plurality of first and second sets of thresholds and adjust a neighbor cell search duration parameter to a value corresponding to the new first and second thresholds.

3. The mobile device of claim 2, wherein updating the current first and second thresholds comprises:
  when the first metric is below the current first threshold:
    searching the plurality of first and second sets of thresholds for a new first threshold based on the first metric;
    updating the current first threshold with the new first threshold; and
    updating the current second threshold based the new first threshold;
  when the first metrics exceed the current second threshold:
    searching the plurality of first and second set of thresholds for a new second threshold based on the first metric;
    updating the current second threshold with the new second threshold; and
    updating the current first threshold based on the new second threshold.

4. The mobile device of claim 1, wherein the at least one of the plurality of physical layer metrics is determined from received synchronization signals received from the one or more neighbor cells and the serving base station.

5. The mobile device of claim 1, wherein the first metrics comprise a reference signal receive quality (RSRQ) measurement of the serving base station.

6. The mobile device of claim 1, wherein the logic is further configured to:
  compare second metrics of the obtained plurality of physical layer metrics against a criteria range;
  wherein adjusting the neighbor cell search duration is performed based on comparing the second metrics against the criteria range.

7. The mobile device of claim 6, wherein comparing the first metrics against the plurality of thresholds is performed in response to the second metrics being within the criteria range.

8. The mobile device of claim 6, wherein the second metrics comprise signal-to-noise ratios (SNR) of received identification signals from the serving base station and the one or more neighbor cells.

9. The mobile device of claim 6, wherein adjusting the neighbor cell search duration is further based on obtained second metrics of the plurality of physical layer metrics exceeding or falling below a criteria range.

10. A method for operating a mobile device in a discontinuous reception mode, comprising:
  at the mobile station:
    obtaining a plurality of physical layer metrics of a serving base station and of one or more neighbor cells;
    comparing first metrics of the obtained plurality of physical layer metrics against a plurality of thresholds, wherein said comparing comprises calculating a difference between a first metric of the obtained plurality of physical layer metrics of the serving base station and the first metric of the obtained plurality of physical layer metrics of the one or more neighbor cells and comparing the difference against the plurality of thresholds; and
    based on the comparison, adjusting a neighbor cell search duration parameter.

11. The method of claim 10, wherein said comparing the first metrics of the obtained plurality of physical layer metrics against a plurality of thresholds further comprises:
  comparing a first metric of the obtained plurality of physical layer metrics against a current first and second threshold of a plurality of respective first and second sets of thresholds of the plurality of neighbor cell search parameters; and
  in response to determining that the first metric is outside of the first and second thresholds, update the current first and second thresholds to new first and second thresholds of the plurality of first and second sets of thresholds and adjust a neighbor cell search duration parameter to a value corresponding to the new first and second thresholds.

12. The method of claim 11, wherein updating the current first and second thresholds comprises:
  when the first metric is below the current first threshold:
    searching the plurality of first and second sets of thresholds for a new first threshold based on the first metric;
    updating the current first threshold with the new first threshold; and
    updating the current second threshold based the new first threshold;
  when the first metrics exceed the current second threshold:
    searching the plurality of first and second set of thresholds for a new second threshold based on the first metric;
    updating the current second threshold with the new second threshold; and
    updating the current first threshold based on the new second threshold.

13. The method of claim 10, wherein the at least one of the plurality of physical layer metrics is determined from received synchronization signals received from the one or more neighbor cells and the serving base station.

14. The method of claim 10, wherein the first metrics comprise a reference signal receive quality (RSRQ) measurement of the serving base station.

15. The method of claim 10, further comprising:
  comparing second metrics of the obtained plurality of physical layer metrics against a criteria range;
  wherein adjusting the neighbor cell search duration is performed based on comparing the second metrics against the criteria range.

16. The method of claim 15, wherein comparing the first metrics against the plurality of thresholds is performed in response to the second metrics being within the criteria range.

17. The method of claim 15, wherein the second metrics comprise signal-to-noise ratios (SNR) of received identification signals from the serving base station and the one or more neighbor cells.

18. The method of claim 15, wherein adjusting the neighbor cell search duration is further based on obtained second metrics of the plurality of physical layer metrics exceeding or falling below a criteria range.

19. An apparatus, comprising:
  one or more processors, wherein the one or more processors is configured to:
    obtain a plurality of physical layer metrics of a serving base station and of one or more neighbor cells;
    compare first metrics of the obtained plurality of physical layer metrics against a plurality of thresholds, wherein said comparing comprises calculating a difference between a first metric of the obtained plurality of physical layer metrics of the serving base station and the first metric of the obtained plurality of physical layer metrics of the one or more neighbor cells and comparing the difference against the plurality of thresholds; and based on the comparison, adjust a neighbor cell search duration parameter.

20. The apparatus of claim 19, wherein said comparing the first metrics of the obtained plurality of physical layer metrics against a plurality of thresholds further comprises:

comparing a first metric of the obtained plurality of physical layer metrics against a current first and second threshold of a plurality of respective first and second sets of thresholds of the plurality of neighbor cell search parameters; and in response to determining that the first metric is outside of the first and second thresholds, update the current first and second thresholds to new first and second thresholds of the plurality of first and second sets of thresholds and adjust a neighbor cell search duration parameter to a value corresponding to the new first and second thresholds.

\* \* \* \* \*